May 14, 1957     M. E. MECATE ET AL     2,791,860
CASTING WEIGHT
Filed Aug. 13, 1954
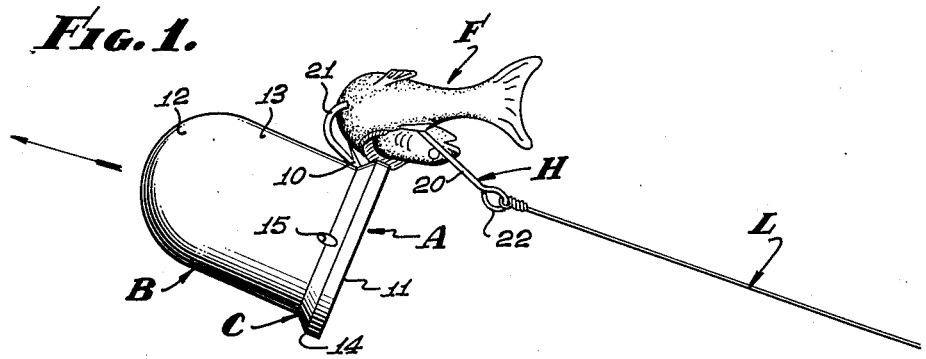
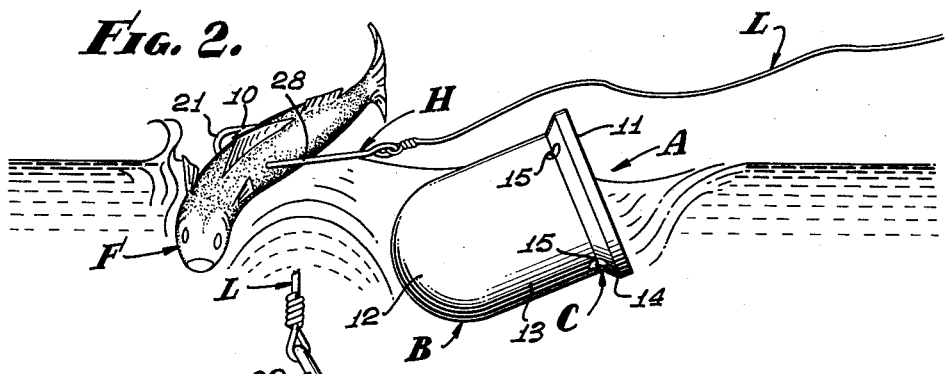
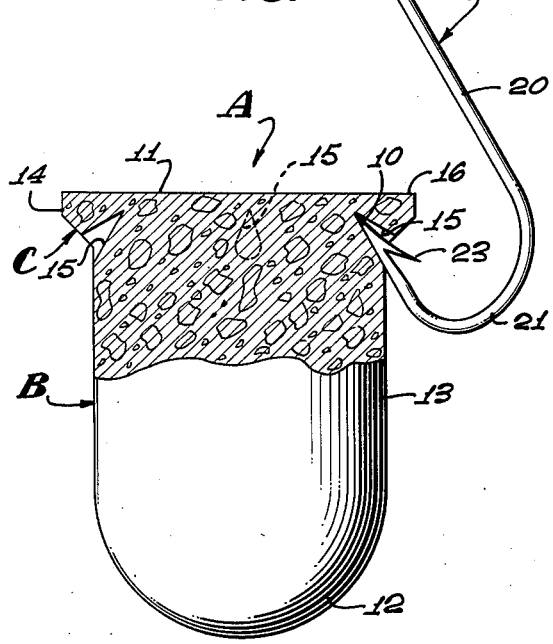
INVENTORS
MANUEL E. MECATE
JAMES E. MECATE
BY
Wm. H. Maxwell Jr.
AGENT.

United States Patent Office 2,791,860
Patented May 14, 1957

2,791,860

CASTING WEIGHT

Manuel E. Mecate and James E. Mecate,
Los Angeles, Calif.

Application August 13, 1954, Serial No. 449,608

3 Claims. (Cl. 43—43.12)

This invention relates to a casting weight for fishing tackle and it is a general object of the invention to provide an expendable casting weight that can be easily and quickly releasably engaged on the tip or point of a standard or conventional fish hook and such that it will remain engaged with the hook when being cast through the air and until the weight and the hook hit the water, whereupon the hook and weight will become disengaged.

It is well recognized that many fish are wary or easily frightened and will not come close to a place where a fisherman is positioned, with the result that it is highly important that a fisherman be able to cast his bait and hook as far away from the place where he is positioned as is possible. In order to cast the bait and hook a substantial distance, it is necessary to apply a weight to the end of a fishing line so that there is enough mass at the end of a line to carry or pull the bait, hook and line through the air. It is common practice, to permanently apply a lead sinker, or the like, to the end of a fishing line when it is desired to cast the bait and hook a substantial distance, which sinker, upon engagement with the water, immediately starts to sink, with the result that the hook and bait engaged thereon is pulled rapidly downward in the water. In many instances it is desirable and important that the bait be permitted to remain at or near the surface of the water and to react in the water as though it were free. An example of such an instance is when live bait, such as anchovies, minnows, or worms is employed to catch fish that are feeding at the water surface.

It is an object of the present invention to provide an elongate casting weight with fish hook engaging means at one end and adapted to be releasably engaged on a point of a fish hook so that the center of gravity of the weight normally occurs beyond or in front of the forward recurvent end of the hook and leads the hook and the line secured thereto when the weight and hook are cast through the air.

It is an object of the present invention to provide a casting weight of the character described that is easy to handle and to apply to a baited fish hook.

The various objects and features of our invention will be fully understood from the following detailed description of a typical preferred form and application of the invention, throughout which description reference is made to the accompanying drawings, in which:

Fig. 1 is an elevational view showing the casting weight provided by the present invention engaged on a baited fish hook at the end of a fishing line and showing the structure being cast, or in flight. Fig. 2 is an elevational view of the structure illustrated in Fig. 1 and showing the casting weight and baited hook entering the water and disengaged. Fig. 3 is an enlarged detailed view of the casting weight provided by the present invention engaged with a fish hook and showing a portion of the weight in section.

The structure provided by the present invention is an expendable casting weight A and includes, generally, an elongate body B and a hook engaging means C on the body and adapted to be releasably engaged by the tip or point 10 of a conventional fish hook H, which hook is secured to the end of an elongate fishing line L.

The body B of the casting weight A provided by the present invention is a simple elongate member and in the particular case illustrated is shown as being round in cross sectional configuration and as being provided with a substantially flat upper or top end 11 and a rounded lower or bottom end 12. The upper and lower ends 11 and 12 of the body B are shown joined together by a substantially straight, vertically disposed side wall 13.

The hook engaging means C provided by the present invention includes an annular flange 14 at one end of the body B and a plurality of circumferentially spaced hook receiving openings 15 extending into the flange and the body.

The flange 14 of the hook engaging means C is shown as an annular, horizontally disposed, radially outwardly projecting part integrally joined to the body B at the upper end thereof and is characterized by a flat horizontally disposed top side 16 flush with the top end 11 of the body B, a radially inwardly and downwardly projecting inclined bottom side 17 joined to the vertical side wall 13 of the body B and a vertically disposed side edge 18 extending between and joining the top and bottom sides 15 and 16 of the flange.

The circumferentially spaced hook receiving openings 15 of the hook engaging means C are simple inwardly convergent openings of limited depth entering the body B and the flange 14 at the point where the bottom side 16 of the flange and the side wall 13 of the body join each other. In the preferred carrying out of the invention, the central longitudinal axis of each opening 14 is inclined relative to the vertical longitudinal axis of the body B, so that it opens downwardly and outwardly from beneath the flange 14 and from the side 13 of the body B. In the particular case illustrated we have shown the casting weight A having four equally spaced openings 14 about its periphery, however, it is to be understood that any desired number of openings 14 can, in practice, be provided.

In the particular case illustrated the fish hook H is a typical or conventional type of fish hook and includes an elongate shank 20 having a recurvent portion 21 at one end, which end will be referred to as the forward end of the hook, and a loop or eye 22 bent or formed at its other or rear end. The terminal or free end of the recurvent portion 21 of the hook H is formed to establish the point 10 of the hook, which point is faced rearwardly. In the particular case illustrated, the point 10 of the hook H is shown as provided with a suitable barb 23, which barb is adapted to prevent bait from being disengaged from the hook and to prevent a fish, when hooked, from becoming disengaged therefrom. The eye 22 at the rear end of the hook shank 20 is adapted to provide means for fastening the hook H to a leader or fishing line and in the particular case illustrated, is shown as having the free or bitter end of a fishing line L engaged therewith.

In Figs. 1 and 2 of the drawings, I have shown the forward recurvent portion 21 of the hook H engaged through and carrying a live fish or bait F, the fish being engaged on the hook in the conventional manner for such bait and so that the point 10 thereof is exposed. It is to be understood that the particular kind of bait employed in no way effects the operation of the casting weight that we provide and that other kinds of live, dead or artificial bait can be used if desired.

From the foregoing, it will be apparent that the casting weight A that we provide can be easily and quickly engaged on the point 10 of the fish hook H in the manner illustrated in Fig. 3 of the drawings and that the weight A when thus engaged on the point of the hook depends from or extends beyond the forward end of the hook and maintains the hook H in tension between the end of the fishing line L and the casting weight A. It will also be apparent that when the set-up or assemblage described above is thrown or cast through the air, the inertia of the heavy casting weight A, coupled with the frictional drag of the line L, as it travels through the air, maintains the hook H engaged with the casting weight and in tension between the casting weight and the fishing line L, as clearly illustrated in Fig. 1 of the drawings.

At the end of the cast and when the set-up or assemblage hits the surface of the water, the casting weight is stopped by the water and the inertia or momentum of the hook, line, and the bait carried by the hook, carries the hook onward and out of engagement with the casting weight A, in the manner clearly illustrated in Fig. 2 of the drawings.

It is to be undersood that the particular hook H shown throughout the drawings and described above, is only for the purpose of illustration and that our casting weight A is equally adaptable for use in connection with fish hooks of various sizes, shapes and constructions.

When the casting weight A that we provide is applied to a fish hook, it will be apparent that the tip of the hook is protected or shielded by the weight and is not subject to becoming snagged or hooked in surrounding obstacles or in other fishermen, as frequently happens when a person is fishing in close quarters or with a group of other fishermen.

In practice, the casting weight A that we provide can be advantageously formed of any suitable material, however, we have found that our casting weight can be advantageously formed of concrete. When concrete is employed to form the casting weight A of the present invention, the weight of the casting weight can be controlled and varied by controlling the concrete aggregate, that is, by adding or subtracting the quantity of rock or gravel in the concrete mixture used to form the casting weight.

Having described only a typical preferred form and application of our invention, we do not wish to be limited or restricted to the specific details herein set forth, but wish to reserve to ourselves any variations or modifications that may appear to those skilled in the art and fall within the scope of the following claims.

Having described our invention, we claim:

1. A casting weight of the character described including, an elongate body, and a flange at one end of the body extending laterally beyond said body, the body and flange having a plurality of spaced openings therein where the flange and body join, and the said openings being adapted to freely receive the point of a fish hook and having bottoms for engagement with said point.

2. A casting weight of the character described including, an elongate normally vertically disposed body, round in cross section, and a horizontally disposed flange at the upper end of the body and projecting radially outwardly and beyond the body, said body and flange having a plurality of circumferentially spaced hook receiving openings of limited depth, and said openings occurring where the flange joins the body and having bottoms for engagement with the point of a fish hook.

3. A casting weight of the character described including, an elongate normally vertically disposed body, round in cross section, and a horizontally disposed flange at the upper end of the body and projecting radially outward from the body, said weight having a plurality of circumferentially spaced inwardly convergent and radially outwardly and downwardly opening hook receiving openings defined in the weight where the flange joins the body.

References Cited in the file of this patent

UNITED STATES PATENTS

| | | |
|---|---|---|
| 1,296,370 | Darling | Mar. 4, 1919 |
| 1,560,938 | Lund | Nov. 10, 1925 |
| 1,583,795 | Pasturzak | May 11, 1926 |
| 2,033,683 | Clark | Mar. 10, 1936 |
| 2,230,456 | Henze | Feb. 4, 1941 |
| 2,460,526 | Oliver | Feb. 1, 1949 |
| 2,465,127 | Stark | Mar. 22, 1949 |
| 2,636,305 | Shoenfelt | Apr. 28, 1953 |
| 2,687,592 | Purcell | Aug. 31, 1954 |
| 2,724,206 | Miller | Nov. 22, 1955 |